US009083909B2

United States Patent
Xie et al.

(10) Patent No.: US 9,083,909 B2
(45) Date of Patent: Jul. 14, 2015

(54) DEVICE, METHOD, AND SCANNER CORRECTING DOCUMENT IMAGE USING CORRECTING MESH CONSTRUCTED ACCORDING TO VERTICAL AND HORIZONTAL BOUNDARIES AND ADJUSTED EXTENDED FILTERED LINES

(71) Applicant: FUJITSU LIMITED, Kawasaki-shi, Kanagawa (JP)

(72) Inventors: Shufu Xie, Beijing (CN); Yuan He, Beijing (CN); Jun Sun, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/547,472

(22) Filed: Nov. 19, 2014

(65) Prior Publication Data

US 2015/0138610 A1    May 21, 2015

(30) Foreign Application Priority Data

Nov. 20, 2013   (CN) .......................... 2013 1 0589148

(51) Int. Cl.
| | |
|---|---|
| *H04N 1/387* | (2006.01) |
| *G06T 3/00* | (2006.01) |
| *G06T 5/00* | (2006.01) |
| *G06T 7/60* | (2006.01) |
| *G06T 7/00* | (2006.01) |

(52) U.S. Cl.
CPC ............ *H04N 1/3873* (2013.01); *G06T 3/0031* (2013.01); *G06T 5/006* (2013.01); *G06T 7/0085* (2013.01); *H04N 2201/0081* (2013.01); *H04N 2201/0434* (2013.01)

(58) Field of Classification Search
None
See application file for complete search history.

(56) References Cited

U.S. PATENT DOCUMENTS

| | | | | |
|---|---|---|---|---|
| 2011/0091129 | A1* | 4/2011 | Ichihashi et al. | 382/275 |
| 2012/0321198 | A1* | 12/2012 | He et al. | 382/199 |
| 2013/0322768 | A1* | 12/2013 | He et al. | 382/199 |
| 2013/0322769 | A1* | 12/2013 | Pan et al. | 382/199 |
| 2013/0330009 | A1* | 12/2013 | Pan et al. | 382/199 |

\* cited by examiner

*Primary Examiner* — Scott A Rogers
(74) *Attorney, Agent, or Firm* — Staas & Halsey LLP

(57) ABSTRACT

Embodiments of the present invention provide a device and method for correcting a document image and a scanner. Wherein the device includes: an extracting unit configured to extract boundaries in a first direction of the document image and extract lines in the first direction according to a content of the document image, a filtering unit configured to filter the extracted lines, a constructing unit configured to extend and adjust the filtered lines and construct a correcting mesh, and a correcting unit configured to perform correcting according to the correcting mesh. An accurate correcting model can be constructed by taking document boundaries and document contents into account in constructing the correcting model and constructing a correcting mesh after filtering, extending and adjusting the extracted lines, thereby effectively eliminating distortion in the document image.

10 Claims, 9 Drawing Sheets

DEVICE, METHOD, AND SCANNER CORRECTING DOCUMENT IMAGE USING CORRECTING MESH CONSTRUCTED ACCORDING TO VERTICAL AND HORIZONTAL BOUNDARIES AND ADJUSTED EXTENDED FILTERED LINES

CROSS-REFERENCE TO RELATED APPLICATION(S)

This application claims the benefit of Chinese Application No. 201310589148.9, filed Nov. 20, 2013, the disclosure of which is incorporated herein by reference.

BACKGROUND

1. Technical Field

The present invention relates to the field of image processing, and in particular to a device and method for correcting a document image and a scanner.

2. Background Art

Currently, in a document image obtained by using a scanner, distortion exists in the image due to a non-planar shape property of the document. In an existing correcting method, it is assumed that the surface of the document is a cylinder model, and correction is performed according to the cylinder model by using the boundaries of the document or boundaries of content regions of the document. As shown in FIG. 1, the document image obtained by scanning has six book corners and book boundaries. FIG. 2 is an image of the document image in FIG. 1 corrected by using the existing correcting method.

It should be noted that the above description of the background art is merely provided for clear and complete explanation of the present invention and for easy understanding by those skilled in the art. And it should not be understood that the above technical solution is known to those skilled in the art as it is described in the background art of the present invention.

SUMMARY

In the existing correcting method, it is assumed that the surface of a document is a cylinder model. However, the actual surface of the document is not an exact cylinder, and after correction is performed according to the cylinder model in the existing method, distortion still exists in the document image.

Embodiments of the present invention provide a device and method for correcting a document image and a scanner, in which an accurate correcting model can be constructed, thereby effectively eliminating distortion in the document image.

According to one aspect of embodiments of the present invention, there is provided a device for correcting a document image, including: an extracting unit configured to extract boundaries in a first direction of the document image, determine boundaries in a second direction of the document image according to the boundaries in the first direction, and extract lines in the first direction according to a content of the document image; wherein the first direction is a horizontal direction or a vertical direction of the document image, and the second direction is vertical to the first direction; a filtering unit configured to filter the lines in the first direction, so that a difference between shapes of the filtered lines and the boundaries in the first direction is within a predetermined range; a constructing unit configured to extend the filtered lines to the boundaries in the second direction of the document image according to the boundaries in the first direction, adjust the extended lines of the filtered lines according to lines adjacent to the filtered lines in the second direction and/or the boundaries in the first direction, and construct a correcting mesh according to the boundaries in the first direction and the second direction and the lines of which the extended lines have been adjusted; and a correcting unit configured to correct the document image according to the correcting mesh.

According to another aspect of embodiments of the present invention, there is provided a scanner, including the device according to the above aspect.

According to a further aspect of embodiments of the present invention, there is provided a method for correcting a document image, including: extracting boundaries in a first direction of the document image, determining boundaries in a second direction of the document image according to the boundaries in the first direction, and extracting lines in the first direction according to a content of the document image; wherein the first direction is a horizontal direction or a vertical direction of the document image, and the second direction is vertical to the first direction; filtering lines in the first direction, so that a difference between shapes of the filtered lines and the boundaries in the first direction is within a predetermined range; extending the filtered lines to the boundaries in the second direction of the document image according to the boundaries in the first direction, adjust the extended lines of the filtered lines according to lines adjacent to the filtered lines in the second direction and/or the boundaries in the first direction, and construct a correcting mesh according to the boundaries in the first direction and the second direction and the lines of which the extended lines have been adjusted; and correcting the document image according to the correcting mesh.

An advantage of embodiments of the present invention resides in that an accurate correcting model can be constructed by taking document boundaries and document contents into account in constructing the correcting model and constructing a correcting mesh after filtering, extending and adjusting lines extracted according to the document contents, thereby effectively eliminating distortion in the document image.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "includes/including" when used in this specification is taken to specify the presence of stated features, integers, steps or components but does not preclude the presence or addition of one or more other features, integers, steps, components or groups thereof.

BRIEF DESCRIPTION OF DRAWINGS

The drawings are described herein to provide further understanding of the embodiments of the present invention, which constitute a part of this application, illustrate modes of implementation of the present invention, and explain principles of the present invention together with literal description. It is obvious that accompanying drawings in the following description are some the embodiments of the present invention, and to those skilled in the art, other accompanying drawings may be obtained according to these accompanying drawings without making an inventive effort. In the drawings.

DETAILED DESCRIPTION

These and further aspects and features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

Embodiment 1

Figure 1:
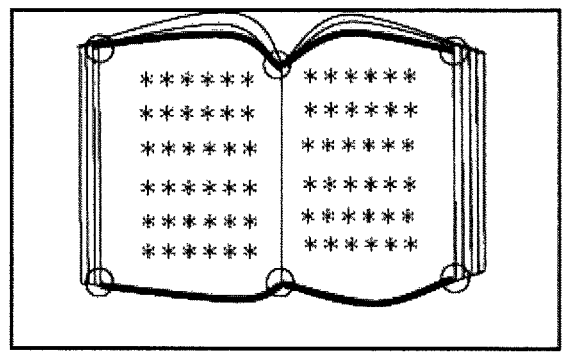
FIG. 1 is a document image obtained by using an existing scanner.
Figure 2:
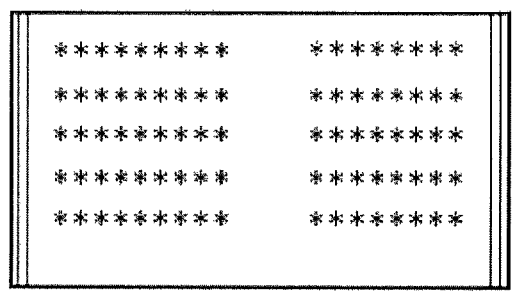
FIG. 2 is an image of the document image in FIG. 1 corrected by using an existing correcting method.
Figure 3:
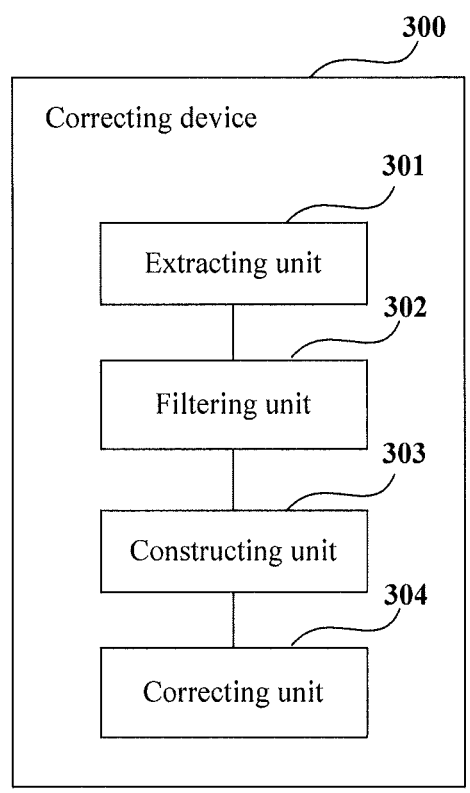
FIG. 3 is a schematic diagram of the structure of a device 300 for correcting a document image of Embodiment 1 of the present invention.

FIG. 3 is a schematic diagram of the structure of a device 300 for correcting a document image of Embodiment 1 of the present invention. As shown in FIG. 3, the device 300 includes: an extracting unit 301, a filtering unit 302, a constructing unit 303 and a correcting unit 304; where, the extracting unit 301 is configured to extract boundaries in a first direction of the document image, determine boundaries in a second direction of the document image according to the boundaries in the first direction, and extract lines in the first direction according to a content of the document image; wherein the first direction is a horizontal direction or a vertical direction of the document image, and the second direction is vertical to the first direction;

the filtering unit 302 is configured to filter the lines in the first direction, so that a difference between shapes of the filtered lines and the boundaries in the first direction is within a predetermined range;

the constructing unit 303 is configured to extend the filtered lines to the boundaries in the second direction of the document image according to the boundaries in the first direction, adjust the extended lines of the filtered lines according to lines adjacent to the filtered lines in the second direction and/or the boundaries in the first direction, and construct a correcting mesh according to the boundaries in the first direction and the second direction and the lines of which the extended lines have been adjusted;

and the correcting unit 304 is configured to correct the document image according to the correcting mesh.

It can be seen from the above embodiment that the document boundaries and document contents are taken into account in constructing a correcting model in the embodiment, and a correcting mesh is constructed after filtering, extending and adjusting the extracted lines, thereby constructing an accurate correcting model, and effectively eliminating distortion in the document image.

In this embodiment, the document image may be obtained by using an existing scanning method to scan a document, and a type of the document is not limited in this embodiment. The description of this embodiment is given taking a double-page document as an example which includes a left page and a right page after being expanded horizontally. However, this embodiment may further be applicable to documents of other types, such as a double-page document including an upper page and a lower page after being expanded vertically, and a single-page document, etc.

In this embodiment, any existing method may be used by the extracting unit 301 to extract the boundaries in the first direction of the document image, determine the boundaries in the second direction of the document image according to the boundaries in the first direction, and extract the lines in the first direction according to the content of the document image, and it is not limited in this embodiment. This embodiment is described taking a horizontally-expanded double-page document as an example; wherein, the first direction is a horizontal direction of the document image, the second direction is a vertical direction of the document image, and the boundary between the left and right pages is referred to as "a ridge"; that is, in this embodiment, the boundaries of the document image in the first direction refer to upper and lower boundaries, the boundaries in the second direction refer to left and right boundaries, the coordinate in the first direction refers to a horizontal coordinate, and the coordinate in the second direction refers to a vertical coordinate.

Furthermore, if this embodiment is applied to a vertically-expanded double-page document, the first direction correspondingly changes into the vertical direction of the document image, and the second direction correspondingly changes into the horizontal direction of the document image.

In this embodiment, the boundaries in the horizontal direction of the document image extracted by the extracting unit 301 may be obtained by means of an existing manual labeling or automatic extracting method, and the boundaries in the vertical direction of the document image may be obtained by connecting endpoints of the boundaries in the horizontal direction after the boundaries in the horizontal direction are obtained. However, such a method is not limited in embodiments of the present invention.

Wherein, in extracting the lines in the horizontal direction by the extracting unit 301 according to the content of the document image, that is, in extracting the lines in the horizontal direction, the lines may be extracted from the text lines in the document image by means of, for example, an existing method, and the lines may be extracted from photo boards or horizontal curves in the document image by means of an existing method, and such a method for extracting is not limited in embodiments of the present invention. The method for extracting of this embodiment shall be described below in an illustrative manner.

Figure 4:
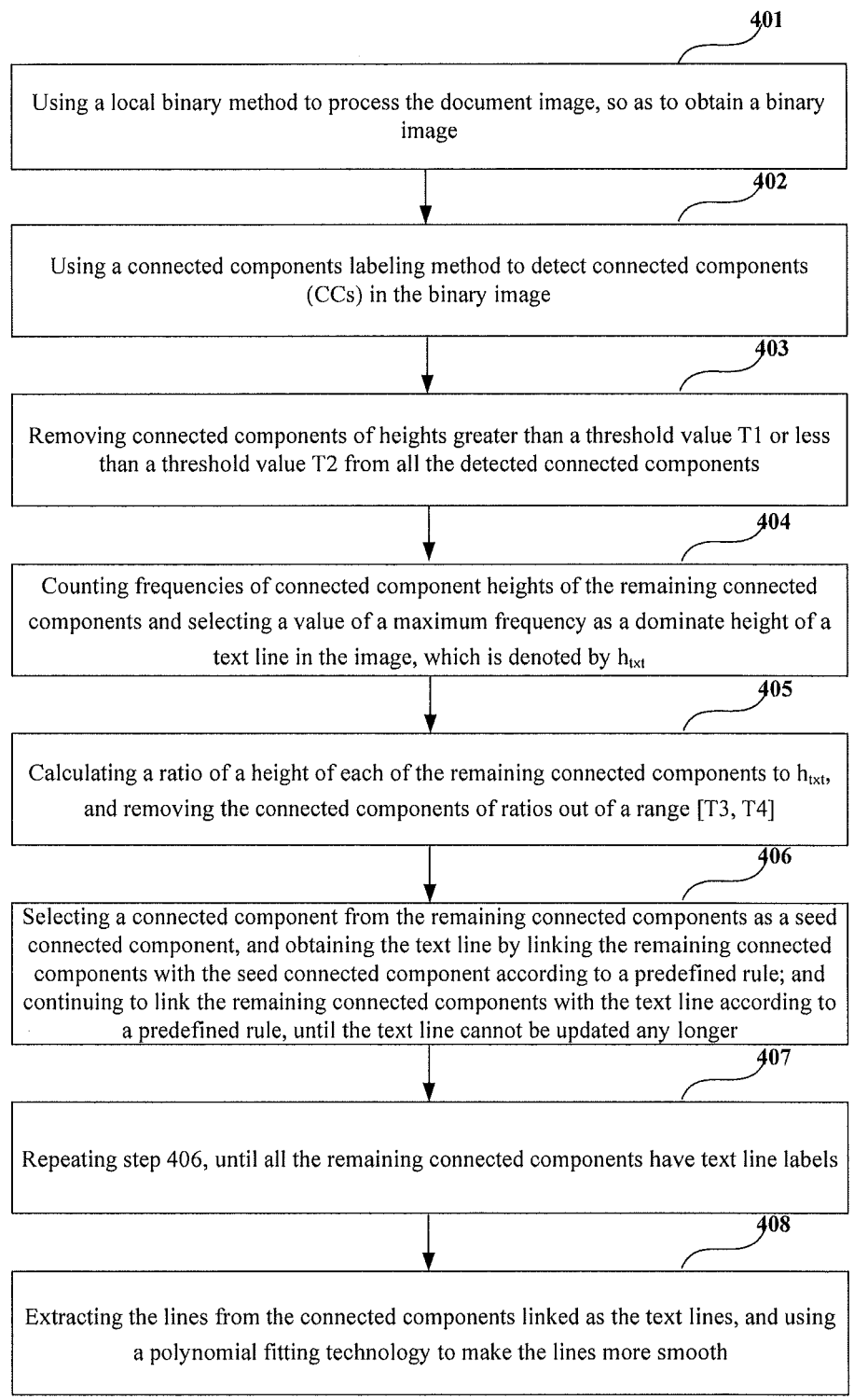
FIG. 4 is a flowchart of a method for extracting lines in a horizontal direction from text lines in the document image of Embodiment 1 of the present invention.

FIG. 4 is a flowchart of a method for extracting lines in the horizontal direction from text lines in the document image of this embodiment. As shown in FIG. 4, the method includes:

step 401: using a local binary method to process the document image, so as to obtain a binary image;

step 402: using a connected components labeling method to detect connected components (CCs) in the binary image;

step 403: removing connected components of heights greater than a threshold value T1 or less than a threshold value T2 from all the detected connected components;

step 404: counting frequencies of connected component heights of the remaining connected components and selecting a value of a maximum frequency as a dominate height of a text line in the image, which is denoted by $h_{txt}$;

step 405: calculating a ratio of a height of each of the remaining connected components to $h_{txt}$, and removing the connected components of ratios out of a range [T3, T4];

step 406: selecting one connected component from the remaining connected components as a seed connected component, and obtaining the text line by linking the remaining connected components with the seed connected component according to a predefined rule; and continuing to link the remaining connected components with the text line according to a predefined rule, until the text line cannot be updated any longer;

step 407: repeating step 406, until all the remaining connected components have text line labels; and step 408: extracting the lines from the connected components linked as the text lines, and using a polynomial fitting technology to make the lines more smooth.

Figure 5:
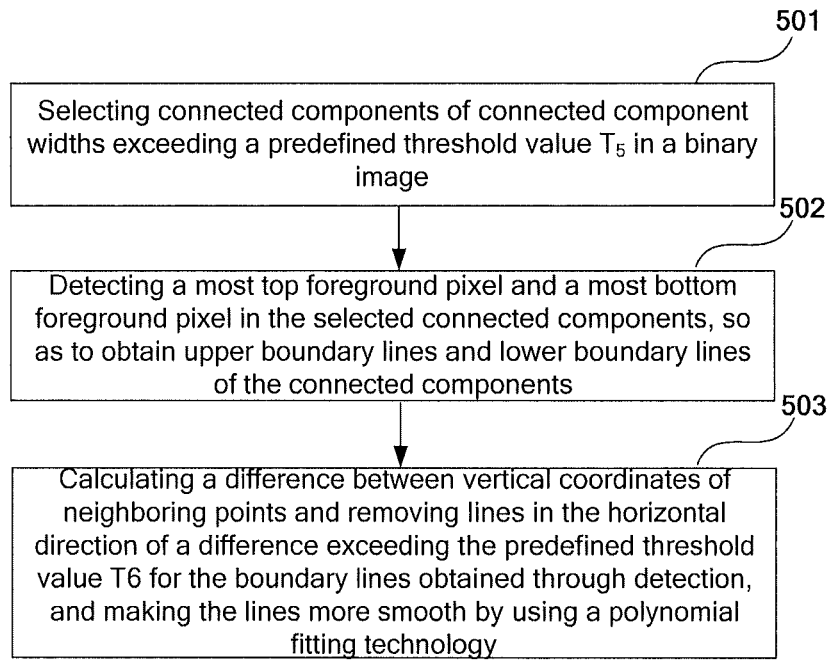
FIG. 5 is a flowchart of a method for extracting lines in a horizontal direction from photo boards or horizontal curves in the document image of Embodiment 1 of the present invention.

FIG. 5 is a flowchart of a method for extracting lines in a horizontal direction from photo boards or horizontal curves in the document image of this embodiment. As shown in FIG. 5, the method includes:

step 501: selecting connected components of connected component widths exceeding a predefined threshold value $T_5$ in a binary image;

step 502: detecting a most top foreground pixel and a most bottom foreground pixel in the selected connected components, so as to obtain upper boundary lines and lower boundary lines of the connected components; and step 503: calculating a difference between vertical coordinates of neighboring points and removing lines in the horizontal direction of a difference exceeding the predefined threshold value $T_6$ for the boundary lines obtained through detection, and making the lines more smooth by using a polynomial fitting technology.

In this embodiment, the filtering unit 302 is configured to filter the lines in the horizontal direction extracted according to the contents of the document image, so that the difference between the shapes of the filtered lines and the upper and lower boundaries is within the predefined range; that is, the filtering unit is used to remove a part of the extracted lines in the horizontal direction, so that the difference between the shapes of the remaining filtered lines in the horizontal direction and the upper and lower boundaries is within the predefined range. Wherein, any existing method may be used to filter the lines, and the method for filtering is not limited in embodiments of the present invention.

In this way, the extracted lines are filtered by using the boundaries of the document image in the first direction (referring to boundaries in the horizontal direction, i.e. the upper and lower boundaries, in this embodiment), and obviously unreasonable lines may be removed, thereby improving the accuracy of the constructed correcting model.

Figure 6:
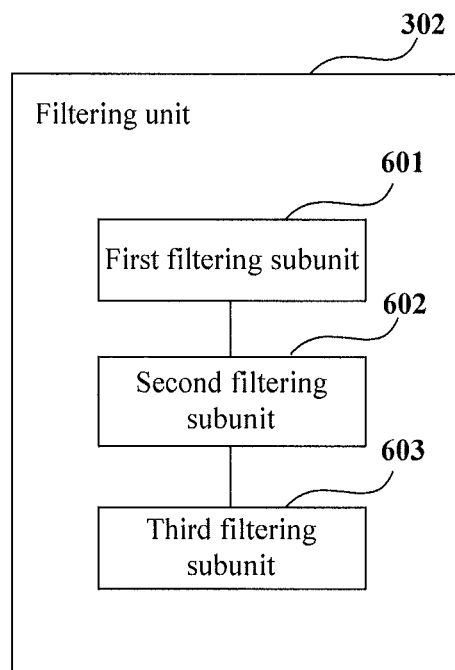
FIG. 6 is a schematic diagram of the structure of a filtering unit of Embodiment 1 of the present invention.

FIG. 6 is a schematic diagram of the structure of the filtering unit of this embodiment; however, this embodiment is not limited to such a structure. As shown in FIG. 6, the filtering unit 302 includes: a first filtering subunit 601, a second filtering subunit 602 and a third filtering subunit 603; wherein, the first filtering subunit 601 is configured to calculate a standard difference of vertical coordinates of points on each line in the horizontal direction, calculate a standard difference of vertical coordinates of corresponding points on the upper and lower boundaries of the document image, and further calculate a difference value between the standard difference of vertical coordinates of the points on each line in the horizontal direction and a maximum value of the standard differences of vertical coordinates of the corresponding points on the upper and lower boundaries, and remove lines where points of the difference values being greater than a predetermined first threshold are located;

the second filtering subunit 602 is configured to calculate a difference value between coordinates in the vertical direction of adjacent points on lines in the horizontal direction, and remove the line where the points of the difference value between coordinates in the vertical direction being greater than a predetermined second threshold are located; and the third filtering subunit 603 is configured to calculate a distance between two adjacent lines in the horizontal direction, and remove the shorter line of the two adjacent lines in the horizontal direction when the distance between the two adjacent lines in the horizontal direction is greater than a predetermined third threshold.

Wherein, the second filtering subunit 602 and the third filtering subunit 603 are optional parts; that is, the filtering unit 302 may not include the second filtering subunit 602 and the third filtering subunit 603, may include only the second filtering subunit 602 or the third filtering subunit 603, and may include both the second filtering subunit 602 and the third filtering subunit 603.

In this embodiment, any existing method may be used to calculate the difference value of the above standard differences, the difference value between coordinates in the vertical direction of the adjacent points, and the distance between two adjacent lines in the horizontal direction, and the method of calculation is not limited in embodiments of the present invention. For example, embodiments of the present invention may use the following method for calculation.

Figure 7:
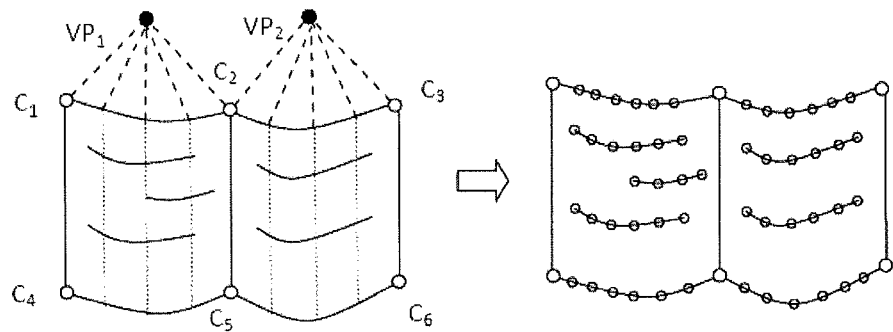
FIG. 7 is a flowchart of a method for obtaining control points by the filtering unit of Embodiment 1 of the present invention in calculating.

FIG. 7 is a flowchart of a method for obtaining control points by the filtering unit 302 of this embodiment in calculating. As shown in FIG. 7, six corner points of the document image are respectively denoted by $C_1$, $C_2$, $C_3$, $C_4$, $C_5$ and $C_6$, and these six corner points define three straight lines, that is, $C_1C_4$, $C_2C_5$ and $C_3C_6$. Two vanish points $VP_1$ and $VP_2$ may be obtained by calculating intersections between two straight lines $C_1C_4$ and $C_2C_5$ and $C_2C_5$ and $C_3C_6$, and the boundaries of the document image and corresponding points on the extracted lines in the horizontal direction may be obtained through calculation according to these two vanish points. Taking the left page of the document image as an example, each point $P_{bot,i}$ on the lower boundary $C_4C_5$ of the document image is connected with the vanish point $VP_1$ to obtain a straight line, and intersections between the straight line and other lines are calculated. Therefore, for each point on the extracted lines in the horizontal direction, its corresponding points on the upper boundary and the lower boundary may be obtained. And for each extracted line, some points, denoted by $P_{i,1}, P_{i,2}, \ldots, P_{i,K}$, may be obtained according to a predefined sampling interval, with corresponding points of these points on the upper boundary and the lower boundary of the document image being denoted by $P_{i,1}^{top}, P_{i,2}^{top}, \ldots, P_{i,k}^{top}$ and $P_{i,1}^{bot}, P_{i,2}^{bot}, \ldots, P_{i,k}^{bot}$; where i and k are positive integers. In this embodiment of the present invention, these points are referred to as "control points" used by the filtering unit in calculating, which are also referred to as "points", for short. Each point on the lines may correspond to a pixel in the image, and may not correspond to a pixel in the image; that is, coordinates of each point may be integers, and may also be non-integers, and they are not limited in embodiments of the present invention.

In this embodiment, in calculating the difference value of the standard differences, the first filtering subunit 601 first calculates standard differences of the vertical coordinates of the corresponding points on the upper boundary and the lower boundary of the document image, which are denoted by $std_{top}$ and $std_{bot}$, respectively, and at the same time, calculates standard difference $std_i$ of the vertical coordinates of the sampling points on the extracted lines in the horizontal direction, then judges whether the lines need to be removed according to formula (1) below after obtaining these standard differences:

$$std_i > \max(std_{top}, std_{bot}) + T_7 \qquad (1);$$

where, $T_7$ denotes a predefined threshold value; and if the above formula (1) is satisfied, the lines may be removed by the first filtering subunit 601, so that the difference between shapes of the filtered lines and the boundaries in the horizontal direction is within the predetermined range.

In this embodiment, the second filtering subunit 602 may calculate a difference $Dif_{i,j}$ between the vertical coordinates of the adjacent points on each extracted lines in the horizontal direction according to formula (2) below:

$$Dif_{i,j} = |y_{i,j} - y_{i,j+1}| \qquad (2):$$

where, $y_{i,j}$ denotes a vertical coordinate of a sampling point $P_{i,j}$, and $y_{i,j+1}$ denotes a vertical coordinate of a sampling point $P_{i,j+1}$, i and j being integers greater than or equal to 0.

When $Dif_{i,j}$ exceeds a predefined threshold value $T_8$, the lines are removed by the second filtering subunit 602, thereby further improving the accuracy of the constructed correcting model.

In this embodiment, any existing method may be used by the third filtering subunit 603 in calculating the distance between two adjacent lines in the horizontal direction. For example, a difference between the vertical coordinates of the corresponding points on the adjacent two lines in the horizontal direction is taken as the distance between the two lines; however, the method of calculation is not limited in embodiments of the present invention.

In this way, using too dense lines for correction is avoided, thereby reducing amount of calculation.

Figure 8:
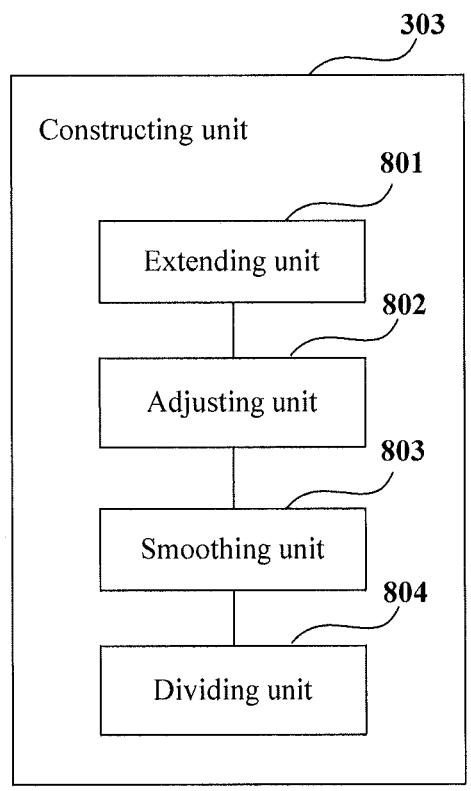
FIG. 8 is a schematic diagram of the structure of a constructing unit of Embodiment 1 of the present invention.

In this embodiment, after obtaining the filtered lines by using the filtering unit 302, the constructing unit 303 extends and adjusts the filtered lines, and constructs the correcting mesh according to the upper and lower boundaries and the extended and adjusted lines. FIG. 8 is a schematic diagram of the structure of the constructing unit 303 of this embodiment; however, embodiments of the present invention are not limited to such a structure. As shown in FIG. 8, the constructing unit 303 includes: an extending unit 801, an adjusting unit 802, a smoothing unit 803 and a dividing unit 804; wherein, the extending unit 801 is configured to extend the filtered lines to the left and right boundaries according to the upper and lower boundaries; wherein a ratio of longitudinal distances of points on the extended lines to corresponding points on the upper and lower boundaries of the document image is made to be equal to a ratio of longitudinal distances of endpoints of the extended lines to corresponding points on the upper and lower boundaries of the document image, so as to determine vertical coordinates of the points on the extended lines, and determine horizontal coordinates of the points according to a straight line determined by corresponding points on the upper and lower boundaries of the document image and the vertical coordinates of the points;

the adjusting unit 802 is configured to adjust the extended lines of the filtered lines according to lines adjacent to the filtered lines in the vertical direction and/or the upper and lower boundaries, wherein all ratios between longitudinal distances of points on the adjusted extended lines to adjacent lines in the vertical direction and/or corresponding points on the upper and lower boundaries of the document image are made to be equal to ratios between distances in the vertical direction of endpoints of the extended lines to adjacent lines in the vertical direction and/or corresponding points on the upper and lower boundaries of the document image, so as to determine vertical coordinates of points on the adjusted extended lines; and determine the horizontal coordinates of the points according to a straight line determined by corresponding points on the upper and lower boundaries of the document image and the vertical coordinates of the points;

the smoothing unit 803 is configured to perform smoothing processing to the lines of which the extended lines have been adjusted; and the dividing unit 804 is configured to divide the document image into regions according to the upper and lower boundaries, the left and right boundaries and the smoothing-processed lines; wherein, a position of a corresponding straight line of the smoothing-processed lines in the horizontal direction in the region-divided document image is determined according to distances between points on the smoothing-processed lines and corresponding points on the upper and lower boundaries of the document image and a distance between the upper and lower boundaries of the document image; or a position of a corresponding straight line of the smoothing-processed lines in the horizontal direction in the region-divided document image is determined according to distances between points adjacent to a ridge of the document image on the smoothing-processed lines and corresponding points on the upper and lower boundaries of the document image and a distance between the upper and lower boundaries of the document image.

Furthermore, the dividing unit 804 may also not perform the smoothing processing, and may perform the dividing directly according to the adjusted lines, and this is not limited in embodiments of the present invention.

In this embodiment, for a double-page document including left and right pages after being expanded horizontally, the extending unit 801 may extend the filtered lines in the horizontal direction in the left page to the left boundary and the ridge, and extend the filtered lines in the horizontal direction in the right page to the right boundary and the ridge, according to the upper and lower boundaries. For example, following method may be used in this embodiment to extend the filtered lines.

Figure 9:
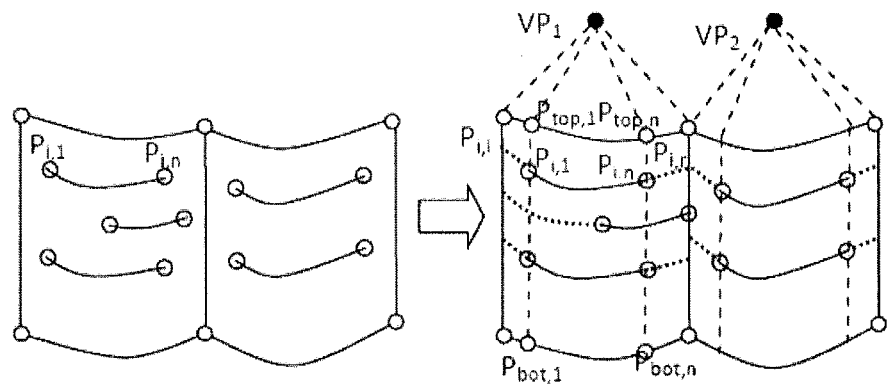
FIG. 9 is a flowchart of a method for extending filtered lines by an extending unit of Embodiment 1 of the present invention.

FIG. 9 is a flowchart of a method for extending filtered lines by the extending unit 801 of this embodiment. As shown in FIG. 9, it is assumed that two endpoints of an i-th extracted line are $P_{i,1}$ and $P_{i,n}$, respectively, i and n being positive integers. Corresponding points of these two endpoints on the upper and lower boundaries of the document image are $P_{top,1}$, $P_{top,n}$, $P_{bot,1}$ and $P_{bot,n}$, respectively. A ratio of the vertical coordinates using the three points $P_{i,1}$, $P_{top,1}$ and $P_{bot,1}$ may be obtained by using formula (3) below:

$$\text{Ratio}=(y_{i,1}-y_{top,1})/(y_{bot,1}-y_{top,1}) \quad (3);$$

where, $y_{i,1}$, $y_{top,1}$ and $y_{bot,1}$ denote the coordinates of the points $P_{i,1}$, $P_{top,1}$ and $P_{bot,1}$, respectively.

The coordinates of points between the point $P_{i,1}$ to its left endpoint $P_{i,l}$ may be obtained through calculation according to such a ratio. For example, a straight line may be obtained according to the point $P_{bot,1}$ on the lower boundary and a vanish point $VP_1$, which is denoted by formula (4) below:

$$A*x+B*y+C=0 \quad (4);$$

A vertical coordinate of a point to be solved may be obtained through calculation by using formula (5) below according to the ratio obtained through calculation by using formula (3) and the corresponding points on the upper and lower boundaries:

$$y_i=y_{top,i}+(y_{bot,i}-y_{top,i})*\text{Ratio} \quad (5);$$

where, $y_i$ denotes the vertical coordinate of the point to be solved. A horizontal coordinate of the point to be solved may be obtained through calculation according to formula (4) and the obtained vertical coordinate of the point to be solved. According to such a method of calculation, vertical coordinates of all points between $P_{i,1}$ and $P_{i,l}$ may be obtained through calculation; likewise, coordinates of points between points $P_{i,n}$ and $P_{i,r}$ may also be obtained through calculation. In this way, coordinates of all points on the extended lines may be obtained, thereby determining positions of all the points on the extended lines.

In this embodiment, the adjusting unit 802 is configured to adjust the extended lines of the filtered lines according to lines adjacent to the filtered lines in the vertical direction and/or the upper and lower boundaries; for example, the following method may be used in this embodiment to adjust the extended lines of the filtered lines.

Figure 10:
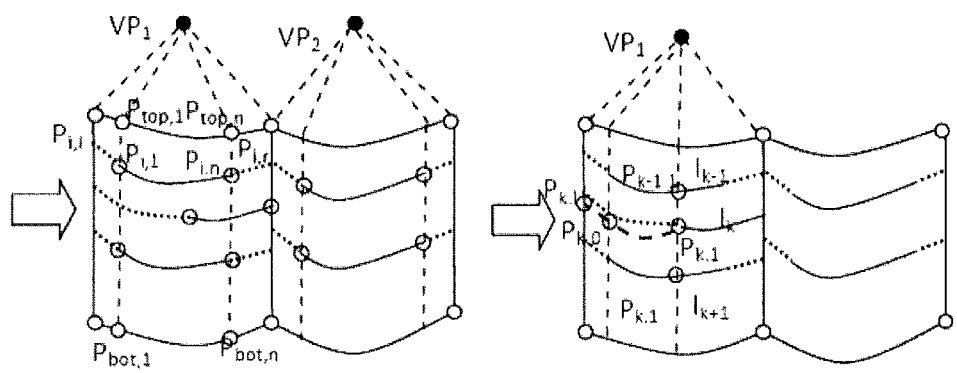
FIG. 10 is a flowchart of a method for adjusting extended lines of filtered lines by an adjusting unit of Embodiment 1 of the present invention.

FIG. 10 is a flowchart of a method for adjusting extended lines of filtered lines by the adjusting unit 802 of this embodiment. As shown in FIG. 10, a line $I_k$ is located between lines $I_{k-1}$ and $I_{k+1}$, k being a positive integer, and points on an extended line of the line $I_k$ may be further adjusted according to the adjacent lines $I_{k-1}$ and $I_{k+1}$. The points between the points $P_{k,l}$ and $P_{k,1}$ are divided into two parts: $P_{k,l}P_{k,0}$ and $P_{k,0}P_{k,1}$; wherein, $P_{k,0}$ is determined by left endpoints of the lines $I_{k-1}$ and $I_{k+1}$ having relatively large horizontal coordinates. A method of adjustment of points between points $P_{k,0}$ and $P_{k,1}$ is similar to that for calculating coordinates of points according to upper and lower boundaries, with the exception that lines $I_{k-1}$ and $I_{k+1}$ are used to replace the upper and lower boundaries; and the coordinates of the points between $P_k$ and $P_{k,0}$ may be adjusted according to an amount of change of the vertical coordinate of the point $P_{k,0}$, which is denoted by formula (6) below:

$$y_{k,j'}=y_{k,j}+dy_{k,0} \quad (6);$$

where, $y_{k,j'}$ denotes the adjusted vertical coordinate of the point $P_{k,j}$, $y_{k,j}$ denotes the vertical coordinate of the point $P_{k,j}$ before being adjusted, and $dy_{k,0}$ denotes the amount of change of the y coordinate of the point $P_{k,0}$. Likewise, points to the right of the line $I_{k+1}$ are also adjusted according to the lines $I_k$ and $I_{bot}$.

In this way, the extended lines of the lines are adjusted by the adjusting unit 802, thereby further improving accuracy of a constructed correcting model.

In this embodiment, the smoothing unit 803 is configured to perform smoothing processing to the lines of which the extended lines have been adjusted, thereby avoiding burr in the corrected document image, and improving the quality of the document image. Wherein, any existing method may be used in the smoothing processing, and the method of smoothing processing is not limited in embodiments of the present invention.

In this embodiment, the dividing unit 804 is configured to divide the document image into regions according to the upper and lower boundaries, the left and right boundaries and the smoothing-processed lines; wherein, any existing method may be used in the region division, and it is not limited in embodiments of the present invention. For example, the region division may be performed in this embodiment by using the following method.

Figure 11:
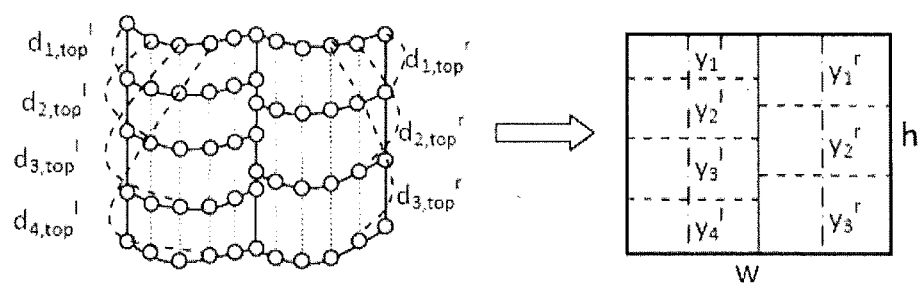
FIG. 11 is a flowchart of a method for dividing regions by a dividing unit of Embodiment 1 of the present invention.

FIG. 11 is a flowchart of a method for dividing regions by the dividing unit 804 of this embodiment. As shown in FIG. 11, points on each smoothing-processed line have identical vertical positions in the corrected image, and the vertical positions may be obtained through calculation by using the following method: for points $P_{top,i}$ on the upper boundary (where, i=1, 2, ..., n), corresponding points of these points on other lines and the lower boundary, are obtained, that is, $P_{k,i}$ (where, k=1, 2, ..., K, i=1, 2, ..., n) and $P_{bot,i}$ (where, i=1, 2, ..., n). A distance between a k-th line and the upper boundary is calculated by using formula (7) below:

$$d_{k,top}=[len(P_{k,1},P_{top,1})+len(P_{k,2},P_{top,2})+\ldots+len(P_{k,n},P_{top,n})]/n \quad (7);$$

where, $d_{k,top}$ denotes the distance between the k-th line and the upper boundary, and $len(P_{k,i},P_{top,i})$ denotes a Euclidean distance between the points $P_{k,i}$ and $P_{top,i}$, and so on.

A vertical position of the k-th line in the corrected image may be obtained through calculation by using formula (8) below:

$$y_k=h*d_{k,top}/d_{bot,top} \quad (8);$$

where, $y_k$ denotes a vertical coordinate of the k-th line, h denotes a height of the corrected image, and $d_{bot,top}$ denotes a distance between the lower boundary and the upper boundary.

In this way, by performing the region division by the dividing unit 804, the whole correcting mesh is constructed.

Figure 12:
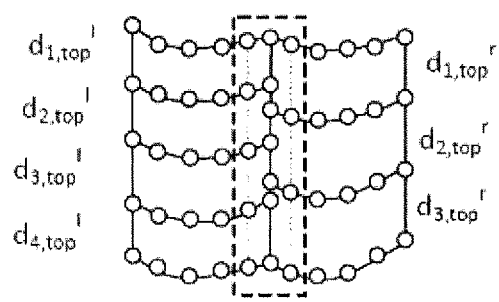
FIG. 12 is a schematic diagram of selecting reference points by the dividing unit of Embodiment 1 of the present invention in performing region division.

In another mode of implementation of this embodiment, $d_{k,top}$ may be calculated by using points close to a ridge of a book, and FIG. 12 is a schematic diagram of selecting a reference point by the dividing unit 804 of this embodiment in performing the region division. As shown in FIG. 12, the points close to the ridge of the book are selected to calculate $d_{k,top}$, with the method of calculation being identical to what is described above, which shall not be described herein any further.

In this way, by performing the region division by selecting the points close to the ridge of the book, the image traversing left and right pages may be ensured to have good continuity in the corrected image.

In this embodiment, the correcting unit 304 is configured to correct the document image according to the correcting mesh constructed by the constructing unit 303. Wherein, any existing method may be used in using the correcting mesh to correct the document image, and it is not limited in embodiments of the present invention. For example, following method may be used in this embodiment for correction.

Figure 13:
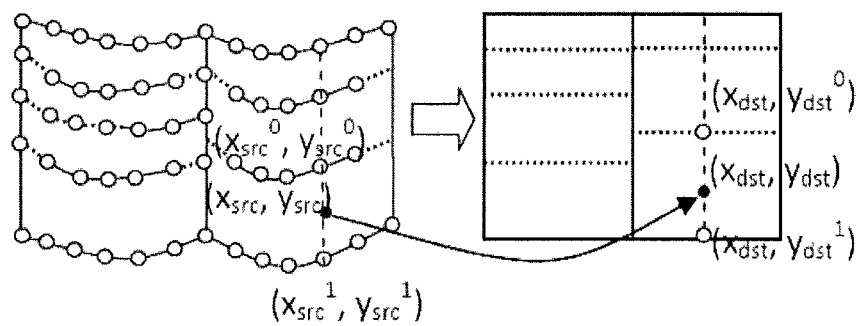
FIG. 13 is a flowchart of a method for correcting an image by using a correcting mesh of Embodiment 1 of the present invention.

Wherein, according to the assumption of a cylinder model, a width and height of the corrected image may be obtained through calculation by using an existing method. For example, the width of the corrected image is equal to a length of the lower boundary of the document image, and its height is equal to an average value of the height of the document image. FIG. 13 is a flowchart of a method for correcting an image by using a correcting mesh of this embodiment. As shown in FIG. 13, transformation between the document image and the corrected image may be obtained through calculation according to the extended lines. Wherein, for a point ($x_{dst}$, $y_{dst}$) in the corrected image, its point ($x_{src}$, $y_{src}$) in the document image may be obtained through calculation according to formulae (9) and (10) below:

$$x_{src} = curve_{len} * x_{dst}/w \qquad (9),$$

$$y_{src} = y_{src}^0 + (y_{src}^1 - y_{src}^0) * (y_{dst} - y_{dst}^0)/(y_{dst}^1 - y_{dst}^0) \qquad (10);$$

where, w denotes the width of the corrected image, $curve_{len}$ denotes the length of the lower boundary of the document image, $y_{dst}^0$ and $y_{dst}^1$ denote vertical coordinates of corresponding points of an upper line and a lower line in the corrected image, respectively, and ($x_{src}^0$, $y_{src}^0$) and ($x_{src}^1$, $y_{src}^1$) denote coordinates of corresponding points in the document image, respectively.

According to the coordinates of the points in the corrected image obtained through calculation, a color value or a luminance value of the point ($x_{dst}$, $y_{dst}$) in the corrected image may be obtained through calculation by using any existing method. For example, it may be obtained through calculation by using a bilinear interpolation operation. And the whole corrected image may be obtained by repeating the above process of calculation for all the points in the document image.

It can be seen from the above embodiment that in the embodiment of the present invention, an accurate correcting model can be constructed by taking document boundaries and document contents into account in constructing the correcting model and constructing a correcting mesh after filtering, extending and adjusting the extracted lines, thereby effectively eliminating distortion in the document image.

Embodiment 2

Figure 14:
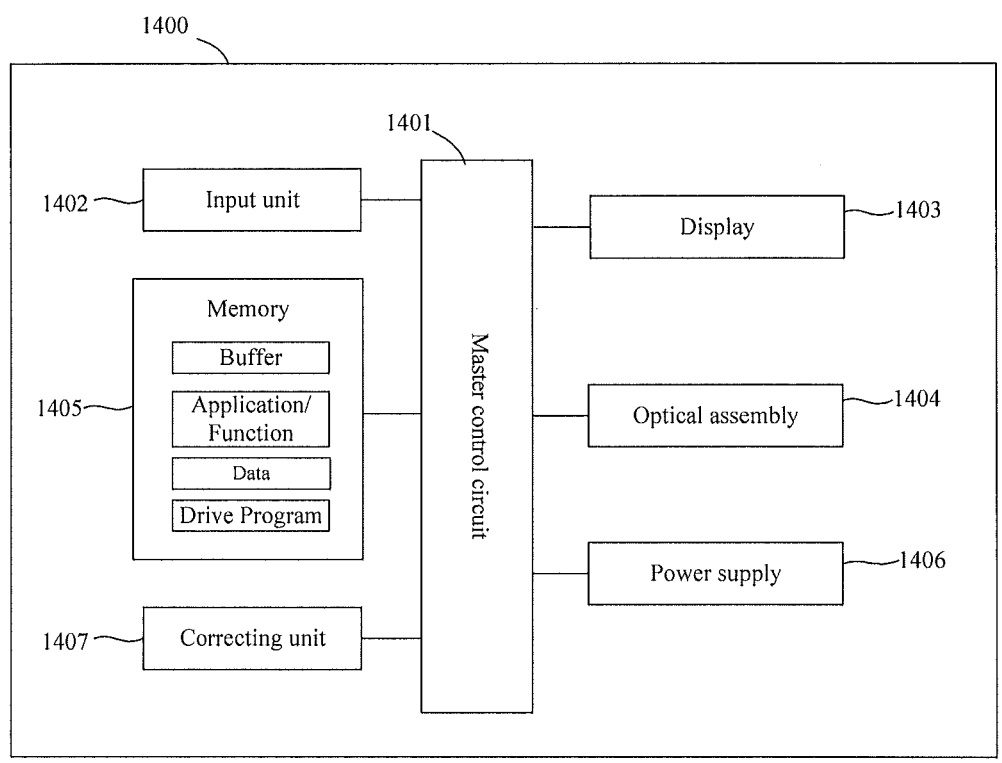
FIG. 14 is a schematic diagram of the structure of a scanner of Embodiment 2 of the present invention.

FIG. 14 is a schematic diagram of the structure of a scanner of Embodiment 2 of the present invention. Such a figure is illustrative only, and the scanner may further have other types of circuit components, so as to supplement or replace the operating circuit, thereby achieving a function of scanning or other functions. And it is obvious that the scanner does not necessarily include all the components shown in FIG. 14.

As shown in FIG. 14, the scanner 1400 includes: a master control circuit 1401, an input unit 1402, a display 1403, an optical assembly 1404, a memory 1405, a power supply 1406 and a correcting unit 1407; wherein, the master control circuit 1401 is also referred to as a controller or an operating control, may include a microprocessor or other processing devices and/or logic devices, and is configured to receive input and control operations of components of the scanner 1400;

the memory 1405 may be, for example, one or more of a buffer, a flash memory, a hard drive, a movable medium, a volatile memory, a nonvolatile memory, or other suitable devices, and the master control circuit 1401 may execute a program stored in the memory 1405; and functions of other components are similar to those in the prior art, which shall not be described herein any further.

The correcting unit 1407 has the structure of the device for correcting described in Embodiment 1, which shall not be described herein any further.

The components of the scanner 1400 may be realized by specific hardware, firmware, software, or a combination thereof, without departing from the scope of the present invention.

It can be seen from the above embodiment that an accurate correcting model can be constructed by taking document boundaries and document contents into account in constructing the correcting model and constructing a correcting mesh after filtering, extending and adjusting the extracted lines, thereby effectively eliminating distortion in the document image.

Embodiments of the present invention further provide a method for correcting a document image, as described in Embodiment 3 below. As the principle of the method for solving problem is similar to the functions of the components of the device for correcting of Embodiment 1, the implementation of the device for correcting of Embodiment 1 is referred to for the implementation of this method, and the identical contents shall not be described herein any further.

Embodiment 3

Figure 15:
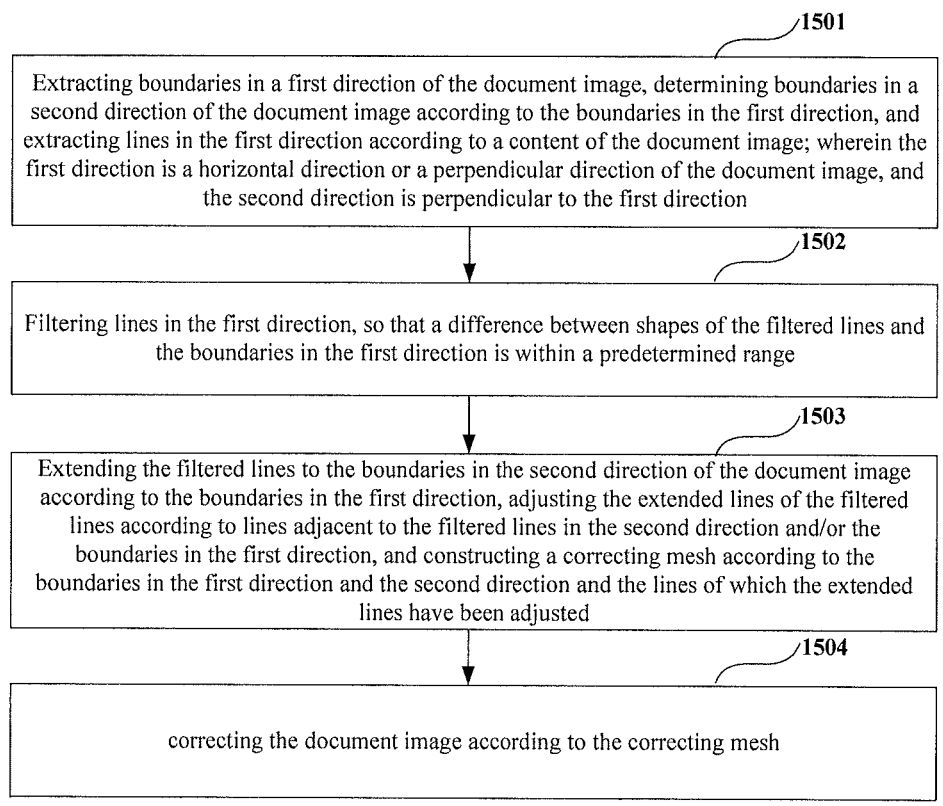
FIG. 15 is a flowchart of a method for correcting a document image of Embodiment 3 of the present invention.

FIG. 15 is a flowchart of the method for correcting a document image of Embodiment 3 of the present invention. As shown in FIG. 15, the method includes:

step 1501: extracting boundaries in a first direction of the document image, determining boundaries in a second direction of the document image according to the boundaries in the first direction, and extracting lines in the first direction according to a content of the document image; wherein the first direction is a horizontal direction or a vertical direction of the document image, and the second direction is vertical to the first direction;

step 1502: filtering lines in the first direction, so that a difference between shapes of the filtered lines and the boundaries in the first direction is within a predetermined range;

step 1503: extending the filtered lines to the boundaries in the second direction of the document image according to the boundaries in the first direction, adjusting the extended lines of the filtered lines according to lines adjacent to the filtered lines in the second direction and/or the boundaries in the first direction, and constructing a correcting mesh according to the boundaries in the first direction and the second direction and the lines of which the extended lines have been adjusted; and step 1504: correcting the document image according to the correcting mesh.

It can be seen from the above embodiment that an accurate correcting model can be constructed by taking document boundaries and document contents into account in constructing the correcting model and constructing a correcting mesh after filtering, extending and adjusting the extracted lines, thereby effectively eliminating distortion in the document image.

The method for extracting the boundaries and lines, the method for filtering, extending and adjusting the lines, the method for constructing a correcting mesh and the method for correcting the image according to the correcting mesh, of this embodiment, are identical to those described in Embodiment 1, which shall not be described herein any further.

For example: in a mode of implementation of this embodiment, the step of filtering the lines in the first direction includes: calculating a standard difference of second-direction coordinates of points on each line in the first direction, calculating a standard difference of second-direction coordinates of corresponding points on the boundaries in the first direction of the document image, and further calculating a difference value between the standard difference of second-direction coordinates of the points on each line in the first direction and a maximum value of the standard differences of second-direction coordinates of the corresponding points on the boundaries in the first direction, and removing lines where points of the difference values being greater than a predetermined first threshold are located.

In another mode of implementation of this embodiment, the step of filtering the lines in the first direction includes: calculating a difference value between coordinates in the second direction of adjacent points on each line in the first direction, and removing lines where the points of the difference value between coordinates in the second direction being greater than a predetermined second threshold are located; and/or calculating a distance between any two adjacent lines in the first direction, and removing the shorter line of the two adjacent lines in the first direction when the distance between the two adjacent lines in the first direction is greater than a predetermined third threshold. In a further mode of implementation of this embodiment, the step of extending the filtered lines to the boundaries in the second direction of the document image according to the boundaries in the first direction includes: making a ratio of longitudinal distances of points on the extended lines to corresponding points on the boundaries in the first direction of the document image to be equal to a ratio of longitudinal distances of endpoints of the filtered lines to corresponding points on the boundaries in the first direction of the document image, so as to determine second-direction coordinates of the points on the extended lines, and determining first-direction coordinates of the points according to a straight line determined by corresponding points on the boundaries in the first direction of the document image and the second-direction coordinates of the points.

In a still further mode of implementation of this embodiment, the step of adjusting the extended lines of the filtered lines according to lines adjacent to the filtered lines in the second direction and/or the boundaries in the first direction includes: making all ratios between longitudinal distances of points on the adjusted extended lines to adjacent lines on the second direction and/or corresponding points on the boundaries in the first direction of the document image to be equal to ratios between distances in the second direction of endpoints of the extended lines to adjacent lines in the second direction and/or a corresponding point on the boundaries in the first direction of the document image, so as to determine coordinates in the second direction of points on the adjusted extended lines; and determining the coordinates in the first direction of the points according to a straight line determined by corresponding points on the boundaries in the first direction of the document image and the coordinates of the points in the second direction. In still another mode of implementation of this embodiment, the step of constructing a correcting mesh according to the boundaries in the first direction and the second direction and the lines of which the extended lines have been adjusted includes: performing smoothing processing to the lines of which the extended lines have been adjusted. In further still another mode of implementation of this embodiment, the step of constructing a correcting mesh according to the boundaries in the first direction and the second direction and the lines of which the extended lines have been adjusted further includes: dividing the document image into regions according to the boundaries in the first and second directions and the smoothing-processed lines; wherein, a position of a corresponding straight line of the smoothing-processed lines in the first direction in the region-divided document image is determined according to distances between points on the smoothing-processed lines and corresponding points on the boundaries in the first direction of the document image and a distance between two boundaries on the first direction of the document image; or a position of a corresponding straight line of the smoothing-processed lines in the first direction in the region-divided document image is determined according to a distance between points adjacent to a ridge of the document image on the smoothing-processed lines and corresponding points on the boundaries in the first direction of the document image and a distance between the two boundaries in the first direction of the document image.

The above apparatus and method of the present invention may be implemented by hardware, or by hardware in combination with software. The present invention relates to such a computer-readable program that when the program is executed by a logic device, the logic device is enabled to carry out the apparatus or components as described above, or to carry out the methods or steps as described above. The present invention also relates to a storage medium for storing the above program, such as a hard disk, a floppy disk, a CD, a DVD, and a flash memory, etc.

The present invention is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

For the implementation containing the above embodiments, following supplements are further disclosed.

Supplement 1.

A device for correcting a document image, including:

an extracting unit configured to extract boundaries in a first direction of the document image, determine boundaries in a second direction of the document image according to the boundaries in the first direction, and extract lines in the first direction according to a content of the document image; wherein the first direction is a horizontal direction or a vertical direction of the document image, and the second direction is vertical to the first direction;

a filtering unit configured to filter the lines in the first direction, so that a difference between shapes of the filtered lines and the boundaries in the first direction is within a predetermined range;

a constructing unit configured to extend the filtered lines to the boundaries in the second direction according to the boundaries in the first direction, adjust the extended lines of the filtered lines according to lines adjacent to the filtered lines in the second direction and/or the boundaries in the first direction, and construct a correcting mesh according to the boundaries in the first direction and the second direction and the lines of which the extended lines have been adjusted; and a correcting unit configured to correct the document image according to the correcting mesh.

Supplement 2.

The device according to supplement 1, wherein the filtering unit includes:

a first filtering subunit configured to calculate a standard difference of second-direction coordinates of points on each line in the first direction, calculate a standard difference of second-direction coordinates of corresponding points on the boundaries in the first direction of the document image, and further calculate a difference value between the standard difference of second-direction coordinates of the points on each line in the first direction and a maximum value of the standard differences of second-direction coordinates of the corresponding points on the boundaries in the first direction, and remove lines where points of the difference values being greater than a predetermined first threshold are located.

Supplement 3.

The device according to supplement 2, wherein the filtering unit further includes:

a second filtering subunit configured to calculate a difference value between coordinates in the second direction of adjacent points on each line in the first direction, and remove lines where the points of the difference value between coordinates in the second direction being greater than a predetermined second threshold are located; and/or a third filtering subunit configured to calculate a distance between any two adjacent lines in the first direction, and remove the shorter line of the two adjacent lines in the first direction when the distance between the two adjacent lines in the first direction is greater than a predetermined third threshold.

Supplement 4.

The device according to supplement 1, wherein the constructing unit includes:

an extending unit configured to extend the filtered lines to the boundaries in the second direction according to the boundaries in the first direction; wherein a ratio of longitudinal distances of points on the extended lines to corresponding points on the boundaries in the first direction of the document image is made to be equal to a ratio of longitudinal distances of endpoints of the filtered lines to corresponding points on the boundaries in the first direction of the document image, so as to determine second-direction coordinates of the points on the extended lines, and determine first-direction coordinates of the points according to a straight line determined by corresponding points on the boundaries in the first direction of the document image and the second-direction coordinates of the points.

Supplement 5.

The device according to supplement 4, wherein the constructing unit further includes:

an adjusting unit configured to adjust the extended lines of the filtered lines according to lines adjacent to the filtered lines in the second direction and/or the boundaries in the first direction, wherein all ratios between longitudinal distances of points on the adjusted extended lines to adjacent lines in the second direction and/or corresponding points on the boundaries in the first direction of the document image are made to be equal to ratios between distances in the second direction of endpoints of the extended lines to adjacent lines in the second direction and/or a corresponding point on the boundaries in the first direction of the document image, so as to determine second-direction coordinates of points on the adjusted extended lines; and the first-direction coordinates of the points are determined according to a straight line determined by corresponding points on the boundaries in the first direction of the document image and the second-direction coordinates of the points.

Supplement 6.

The device according to supplement 5, wherein the constructing unit further includes:

a smoothing unit configured to perform smoothing processing to the lines of which the extended lines have been adjusted.

Supplement 7.

The device according to supplement 6, wherein the constructing unit further includes:

a dividing unit configured to divide the document image into regions according to the boundaries in the first direction and the second direction and the smoothing-processed lines, wherein, a position of a corresponding straight line of the smoothing-processed lines in the first direction in the region-divided document image is determined according to distances between points on the smoothing-processed lines and corresponding points on the boundaries in the first direction of the document image and a distance between two boundaries in the first direction of the document image; or a position of a corresponding straight line of the smoothing-processed lines in the first direction in the region-divided document image is determined according to a distance between points adjacent to a ridge of the document image on the smoothing-processed lines and corresponding points on the boundaries in the first direction of the document image and a distance between two boundaries in the first direction of the document image.

Supplement 8.

A scanner, including the device according to supplement 1.

Supplement 9.

A method for correcting a document image, including:

extracting boundaries in a first direction of the document image, determining boundaries in a second direction of the document image according to the boundaries in the first direction, and extracting lines in the first direction according to a content of the document image; wherein the first direction is a horizontal direction or a vertical direction of the document image, and the second direction is vertical to the first direction;

filtering lines in the first direction, so that a difference between shapes of the filtered lines and the boundaries in the first direction is within a predetermined range;

extending the filtered lines to the boundaries in the second direction of the document image according to the boundaries in the first direction, adjusting the extended lines of the filtered lines according to lines adjacent to the filtered lines in the second direction and/or the boundaries in the first direction, and constructing a correcting mesh according to the boundaries in the first direction and the second direction and the lines of which the extended lines have been adjusted; and correcting the document image according to the correcting mesh.

Supplement 10.

The method according to supplement 9, wherein the step of filtering the line in the first direction includes:

calculating a standard difference of second-direction coordinates of points on each line in the first direction, calculating a standard difference of second-direction coordinates of corresponding points on the boundaries in the first direction of the document image, and further calculating a difference value between the standard difference of second-direction coordinates of the points on each line in the first direction and a maximum value of the standard differences of second-direction coordinates of the corresponding points on the boundaries in the first direction; and removing lines where points of the difference values being greater than a predetermined first threshold are located.

Supplement 11.

The method according to supplement 10, wherein the step of filtering the line in the first direction further includes:

calculating a difference value between coordinates in the second direction of adjacent points on each line in the first direction, and removing lines where the points of the difference value between coordinates in the second direction being greater than a predetermined second threshold are located; and/or calculating a distance between any two adjacent lines in the first direction, and removing the shorter line of the two adjacent lines in the first direction when the distance between the two adjacent lines in the first direction is greater than a predetermined third threshold.

Supplement 12.

The method according to supplement 9, wherein the step of extending the filtered lines to the boundaries in the second direction of the document image according to the boundaries in the first direction includes:

making a ratio of longitudinal distances of points in the extended lines to corresponding points on the boundaries in the first direction of the document image to be equal to a ratio of longitudinal distances of endpoints of the filtered lines to corresponding points on the boundaries in the first direction of the document image, so as to determine second-direction coordinates of points on the extended lines, and determining first-direction coordinates of the points according to a straight line determined by corresponding points on the boundaries in the first direction of the document image and the second-direction coordinates of the points.

Supplement 13.

The method according to supplement 12, wherein the step of adjusting the extended lines of the filtered lines according to lines adjacent to the filtered lines in the second direction and/or the boundaries in the first direction includes:

making all ratios between longitudinal distances of points on the adjusted extended lines to adjacent lines in the second direction and/or corresponding points on the boundaries in the first direction of the document image to be equal to ratios between distances in the second direction of endpoints of the extended lines to adjacent lines in the second direction and/or corresponding points on the boundaries in the first direction of the document image, so as to determine coordinates in the second direction of points on the adjusted extended lines; and determining the coordinates in the first direction of the points according to a straight line determined by corresponding points on the boundaries in the first direction of the document image and the coordinates of the points in the second direction.

Supplement 14.

The method according to supplement 13, wherein the step of constructing a correcting mesh according to the boundaries in the first direction and the second direction and the lines of which the extended lines have been adjusted includes:

performing smoothing processing to the lines of which the extended lines have been adjusted.

Supplement 15.

The method according to supplement 14, wherein the step of constructing a correcting mesh according to the boundaries in the first direction and the second direction and the lines of which the extended lines have been adjusted further includes:

dividing the document image into regions according to the boundaries in the first and second directions and the smoothing-processed lines; wherein, a position of a corresponding straight line of the smoothing-processed lines in the first direction in the region-divided document image is determined according to distances between points on the smoothing-processed lines and corresponding points on the boundaries in the first direction of the document image and a distance between two boundaries in the first direction of the document image; or a position of a corresponding straight line of the smoothing-processed lines in the first direction in the region-divided document image is determined according to distances between points adjacent to a ridge of the document image on the smoothing-processed lines and corresponding points on the boundaries in the first direction of the document image and a distance between the two boundaries in the first direction of the document image.

What is claimed is:

1. A device for correcting a document image, comprising:
an extracting unit configured to extract first boundaries in a first direction of the document image, determine second boundaries in a second direction of the document image according to the first boundaries in the first direction, and extract lines in the first direction according to a content of the document image, where the first direction is one of a horizontal direction and a vertical direction of the document image, and the second direction is perpendicular to the first direction;
a filtering unit configured to filter the lines in the first direction such that a difference between shapes of filtered lines and the first boundaries in the first direction is within a predetermined range;
a constructing unit configured to extend the filtered lines to the second boundaries in the second direction according to the first boundaries in the first direction, adjust extended lines of the filtered lines according to adjacent lines adjacent to the filtered lines in the second direction and/or the first boundaries in the first direction, and construct a correcting mesh according to the first boundaries in the first direction and the second boundaries in the second direction and lines of which the extended lines have been adjusted; and
a correcting unit configured to correct the document image according to the correcting mesh.

2. The device according to claim 1, wherein the filtering unit comprising:
a first filtering subunit configured to calculate a standard difference of second-direction coordinates of points on each line in the first direction, calculate a standard difference of second-direction coordinates of corresponding points on the first boundaries in the first direction of the document image, and further calculate a difference value between the standard difference of second-direction coordinates of the points on each line in the first direction and a maximum value of the standard differences of second-direction coordinates of the corresponding points on the first boundaries in the first direction, and remove lines where points of the difference values being greater than a predetermined first threshold are located.

3. The device according to claim 2, wherein the filtering unit further comprising one of:
a second filtering subunit configured to calculate a difference value between coordinates in the second direction of adjacent points on each line in the first direction, and remove lines where the points of the difference value between coordinates in the second direction being greater than a predetermined second threshold are located; and
a third filtering subunit configured to calculate a distance between any two adjacent lines in the first direction, and remove a shorter line of the two adjacent lines in the first direction when the distance between the two adjacent lines in the first direction is greater than a predetermined third threshold.

4. The device according to claim 1, wherein the constructing unit comprising:
an extending unit configured to extend the filtered lines to the second boundaries in the second direction according to the first boundaries in the first direction; wherein a ratio of longitudinal distances of points on the extended lines to corresponding points on the first boundaries in the first direction of the document image is made to be equal to a ratio of longitudinal distances of endpoints of the filtered lines to corresponding points on the first boundaries in the first direction of the document image, to determine second-direction coordinates of the points on the extended lines, and determine first-direction coordinates of the points according to a straight line determined by corresponding points on the first boundaries in the first direction of the document image and the second-direction coordinates of the points.

5. The device according to claim 4, wherein the constructing unit further comprising:
an adjusting unit configured to adjust the extended lines of the filtered lines according to one of lines adjacent to the filtered lines in the second direction and the boundaries in the first direction, where all ratios between longitudinal distances of points on the adjusted extended lines to one of adjacent lines in the second direction and corresponding points on the first boundaries in the first direction of the document image are made to be equal to ratios between distances in the second direction of endpoints of the extended lines to adjacent lines in the second direction and corresponding points on the boundaries in the first direction of the document image, to determine second-direction coordinates of points on the adjusted extended lines; and the first-direction coordinates of the points are determined according to a straight line determined by corresponding points on the first boundaries in the first direction of the document image and the second-direction coordinates of the points.

6. The device according to claim 5, wherein the constructing unit further comprising:
a smoothing unit configured to perform smoothing processing to lines of which the extended lines have been adjusted.

7. The device according to claim 6, wherein the constructing unit further comprising:
a dividing unit configured to divide the document image into regions according to the first boundaries in the first direction and the second boundaries the second direction and smoothing-processed lines, wherein, one of:
a position of a corresponding straight line of the smoothing-processed lines in the first direction in the region-divided document image is determined according to distances between points on the smoothing-processed lines and corresponding points on the first boundaries in the first direction of the document image and a distance between two boundaries in the first direction of the document image; and
a position of a corresponding straight line of the smoothing-processed lines in the first direction in the region-divided document image is determined according to a distance between points adjacent to a ridge of the document image on the smoothing-processed lines and corresponding points on the first boundaries in the first direction of the document image and a distance between two boundaries in the first direction of the document image.

8. A scanner, comprising the device according to claim 1.

9. A method for correcting a document image, comprising:
extracting boundaries in a first direction of the document image, determining second boundaries in a second direction of the document image according to the first boundaries in the first direction, and extracting lines in the first direction according to a content of the document image; wherein the first direction is one of a horizontal direction and a vertical direction of the document image, and the second direction is perpendicular to the first direction;
filtering lines in the first direction, so that a difference between shapes of filtered lines and the first boundaries in the first direction is within a predetermined range;
extending the filtered lines to the second boundaries in the second direction of the document image according to the first boundaries in the first direction, adjusting extended lines of the filtered lines according to adjacent lines adjacent to one of the filtered lines in the second direction and the boundaries in the first direction, and constructing a correcting mesh according to the first boundaries in the first direction and the second boundaries in the second direction and lines of which the extended lines have been adjusted; and
correcting the document image according to the correcting mesh.

10. The method according to claim 9, wherein the filtering the line in the first direction comprising:
calculating a standard difference of second-direction coordinates of points on each line in the first direction, calculating a standard difference of second-direction coordinates of corresponding points on the first boundaries in the first direction of the document image, and further calculating a difference value between the standard difference of second-direction coordinates of points on each line in the first direction and a maximum value of the standard differences of second-direction coordinates of the corresponding points on the first boundaries in the first direction, and
removing lines where points of the difference values being greater than a predetermined first threshold are located.

* * * * *

UNITED STATES PATENT AND TRADEMARK OFFICE
CERTIFICATE OF CORRECTION

PATENT NO. : 9,083,909 B2  
APPLICATION NO. : 14/547472  
DATED : July 14, 2015  
INVENTOR(S) : Shufu Xie et al.

Page 1 of 1

It is certified that error appears in the above-identified patent and that said Letters Patent is hereby corrected as shown below:

In the claims

Claim 7, Column 19, Line 50

After "boundaries" insert --in--.

Signed and Sealed this
Twenty-seventh Day of October, 2015

Michelle K. Lee
*Director of the United States Patent and Trademark Office*